(No Model.)
F. W. CARPENTER.
DUST PAN.
No. 285,877. Patented Oct. 2, 1883.
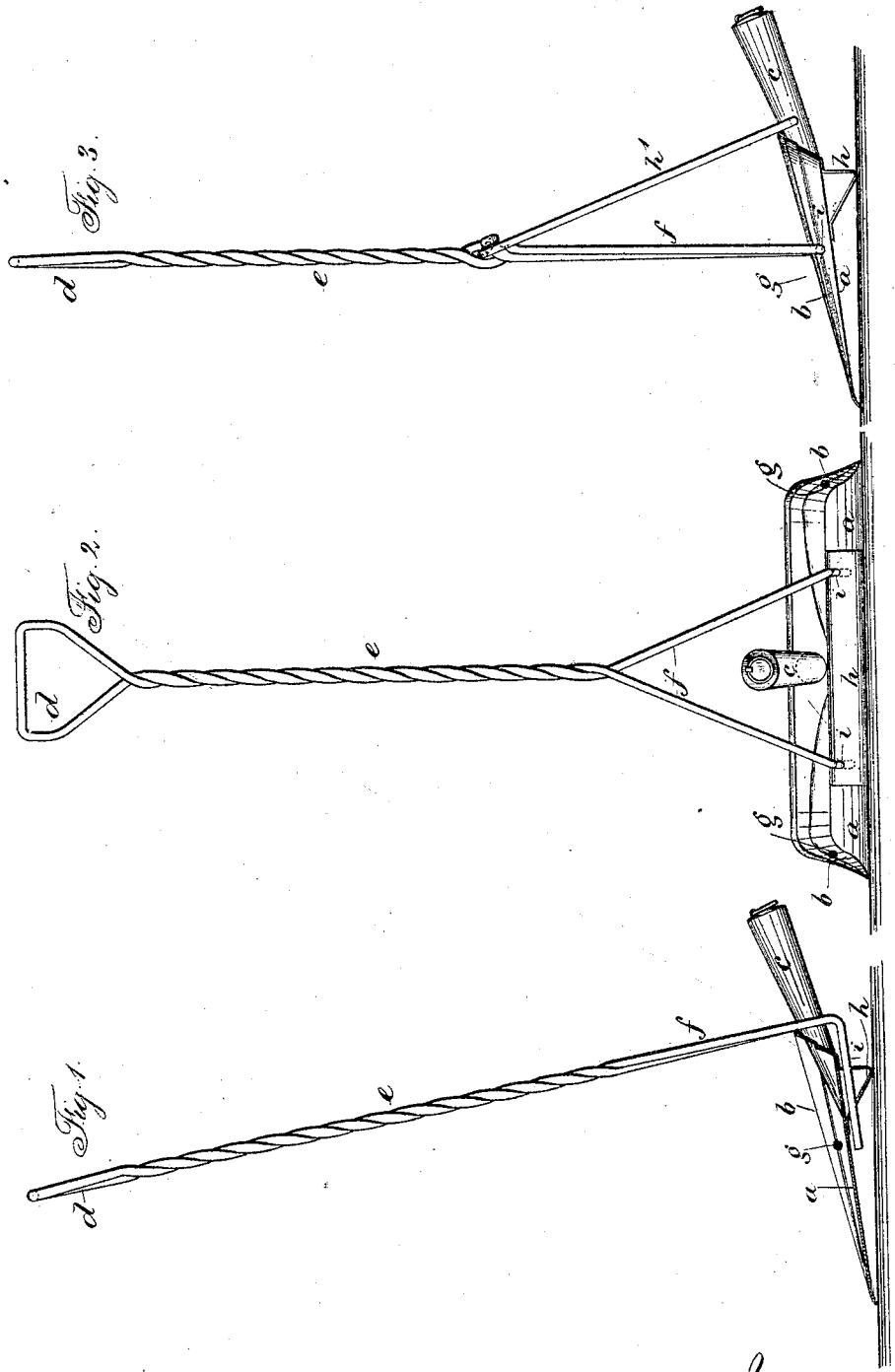

UNITED STATES PATENT OFFICE.

FRANCIS W. CARPENTER, OF HARRISON, NEW YORK.

DUST-PAN.

SPECIFICATION forming part of Letters Patent No. 285,877, dated October 2, 1883.

Application filed June 4, 1883. (No model.)

*To all whom it may concern:*

Be it known that I, FRANCIS W. CARPENTER, of Harrison, in the county of Westchester, State of New York, have invented an Improvement in Dust-Pans, of which the following is a specification.

This invention is a modification of the device patented to me May 8, 1883, No. 277,225, and relates, especially, to the handle, which is made so as to be light and strong and adapted to the peculiar circumstances of use, and the handle remains in a fixed position over the pan, and the pan can be moved from place to place, and will stand upon the floor unsupported while dust is being swept into it.

In the drawings, Figure 1 is an elevation, partially in section, of the dust-pan and my improved handle. Fig. 2 is a rear view of the same; and Fig. 3 is a side view of the improved handle, adapted to use in a manner similar to that in my aforesaid patent.

The dust-pan is made with the bottom $a$, sides $b$, and handle $c$ similar to the pans in general use.

My improved handle is made of wire, having a bow or handle, $d$, a twisted body, $e$, and a spread-fork, $f$, and horizontal ends $i$, to connect with the pan. The wire made use of is to be sufficiently large to furnish the necessary strength and stiffness, and the body $e$ is sufficiently rigid in consequence of the wire being twisted together. The horizontal ends $i$ $i$ of the handle portion are entered into holes in the pan, so as to be connected to the same. In Figs. 1 and 2, I have shown the bearing-piece $h$ as soldered to the under side of the pan at the back, to lift the back portion from the floor sufficiently to allow the front edge of the pan to sit tightly upon the floor, and the ends $i$ $i$ of the handle pass into holes through the bearing-piece $h$. In this manner the handle will have a slight forward inclination when resting on the floor, so that its weight and leverage will press the front edge of the pan down upon the floor. The handle is of a length to allow for easily lifting the pan from place to place, and said pan may be allowed to remain on the floor while dust is being swept into it; or the handle may be held by one hand while the sweeping is done by the other hand; and the handle can be disconnected from the pan by simply drawing the horizontal ends out from the holes.

By reference to Fig. 3 it will be seen that the handle shown therein is a substitute for the handle shown in my Patent No. 277,225. The loop or handle portion $d$, the twisted body $e$, and the lower ends spread as a fork and terminate in horizontal ends $i$, as before described; but these ends $i$ are bent so as to be in line with and to project toward each other, and they are to be sprung into the holes $g$, made in the sides of the dust-pan, and to take the places of the pivots shown in my aforesaid patent.

The hook $h'$ is to be linked to the wire handle in any suitable manner, and the hooked end passes into a hole bored into the handle $c$ of the dust-pan, to hold the parts in their proper relations to each other, as in my aforesaid patent.

These improved handles can be removed from or hooked into the pan, as occasion requires, so that the pan can be used without the handle, in the ordinary manner, or the handle be applied, as required.

I claim as my invention—

1. The combination, with the dust-pan, of a removable handle having hooks at the lower ends to pass into and connect with the pan, substantially as set forth.

2. The combination, with the dust-pan, of a handle, of one piece of wire, with hooks at the lower ends, and a bearing-piece upon the pan, whereby the pan is adapted to remain in position for dust to be swept into it, substantially as specified.

3. The combination, with a dust-pan, of a removable wire handle having a loop at the upper end, the body portion twisted together, a fork at the lower ends, and hooks to pass into holes in the bearing-piece upon the dust-pan, substantially as set forth.

4. The removable handle, of wire, having a loop at the upper end, the body portion twisted together, the lower ends spread as a fork and formed as hooks, adapted to be passed into or removed from holes in the dust-pan, substantially as set forth.

5. The combination, with the dust-pan, of a bearing to cause the pan to rest properly upon the floor, a handle inclined over the pan and connected thereto at its lower end or ends, and means for supporting the handle at a forward inclination over the pan, so that the weight and leverage will aid in causing the front edge of the pan to rest down upon the floor, substantially as set forth.

6. The dust-pan having the bottom $a$, sides $b$, and handle $c$, in combination with a removable handle extending above the pan, and means for supporting the handle in its position over the pan, so that its weight and leverage will press the front of the pan upon the floor, substantially as set forth.

Signed by me this 2d day of June, A. D. 1883.

FRANCIS W. CARPENTER.

Witnesses:
 GEO. T. PINCKNEY,
 WILLIAM G. MOTT.